US012565392B2

(12) United States Patent
Allen et al.

(10) Patent No.: US 12,565,392 B2
(45) Date of Patent: *Mar. 3, 2026

(54) METHOD AND APPARATUS FOR PROCESSING ENVELOPES CONTAINING CONTENTS

(71) Applicant: OPEX Corporation, Moorestown, NJ (US)

(72) Inventors: John Allen, Moorestown, NJ (US); Robert DeWitt, Moorestown, NJ (US); Joseph Valinsky, Moorestown, NJ (US)

(73) Assignee: OPEX Corporation, Moorestown, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 18/792,666

(22) Filed: Aug. 2, 2024

(65) Prior Publication Data

US 2024/0391719 A1 Nov. 28, 2024

Related U.S. Application Data

(63) Continuation of application No. 17/103,300, filed on Nov. 24, 2020, now Pat. No. 12,077,405, which is a (Continued)

(51) Int. Cl.

*B65H 7/04* (2006.01)
*B43M 7/00* (2006.01)

(Continued)

(52) U.S. Cl.

CPC ............... *B65H 7/04* (2013.01); *B43M 7/005* (2013.01); *B43M 7/02* (2013.01); *B65H 1/025* (2013.01);

(Continued)

(58) Field of Classification Search

CPC .......... B65H 2511/528; B65H 2513/41; B65H 2515/34; B65H 2801/66; B65H 7/04; B65H 1/025; B65H 5/00; B65H 2511/515; B65H 2511/34; B65H 2701/1916; B65H 7/06; B43M 7/005; B43M 7/02

See application file for complete search history.

(56) References Cited

U.S. PATENT DOCUMENTS 3,301,116 A 1/1967 Owen
3,966,193 A * 6/1976 Storace .................. B65H 1/025 271/166

(Continued)

FOREIGN PATENT DOCUMENTS

EP 224939 6/1987
GB 2240959 8/1991

(Continued)

*Primary Examiner* — Joshua E Rodden
(74) *Attorney, Agent, or Firm* — Brian Dinicola

(57) ABSTRACT

A method and apparatus for processing mail is provided. A feeder serially feeds envelope from a stack of mail. Two cutters at a cutting station cuts one or two edges of the envelopes. As the envelopes travel from the feeder to the cutters the envelope is jogged on two edges to justify the contents with the envelopes. Additionally, an improved feeder is provided to reduce the number of jams created when feeding the envelopes from the stack.

4 Claims, 7 Drawing Sheets

Related U.S. Application Data continuation of application No. 14/584,284, filed on Dec. 29, 2014, now Pat. No. 10,850,936, which is a continuation of application No. 13/103,763, filed on May 9, 2011, now Pat. No. 8,919,084.

(60) Provisional application No. 61/332,520, filed on May 7, 2010.

(51) Int. Cl.

| | |
|---|---|
| ***B43M 7/02*** | (2006.01) |
| ***B65H 1/02*** | (2006.01) |
| ***B65H 5/00*** | (2006.01) |
| ***B65H 7/06*** | (2006.01) |

(52) U.S. Cl.

CPC ................. *B65H 5/00* (2013.01); *B65H 7/06* (2013.01); *B65H 2511/528* (2013.01); *B65H 2513/41* (2013.01); *B65H 2515/34* (2013.01); *B65H 2801/66* (2013.01)

(56) References Cited

U.S. PATENT DOCUMENTS

| | | | | | |
|---|---|---|---|---|---|
| 4,318,322 | A * | 3/1982 | Russell | B43M 7/02 | 271/223 |
| 5,188,504 | A | 2/1993 | Nelson | | |
| 5,464,099 | A * | 11/1995 | Stevens | B07C 1/00 | 414/403 |
| 5,926,392 | A * | 7/1999 | York | G06K 13/10 | 700/223 |
| 6,230,471 | B1 | 5/2001 | Robertson et al. | | |
| 6,250,625 | B1 * | 6/2001 | Janatka | B43M 3/04 | 271/9.12 |
| 6,315,286 | B1 | 11/2001 | Muenchinger et al. | | |
| 6,364,310 | B1 | 4/2002 | Forbes | | |
| 6,505,534 | B2 | 1/2003 | Robertson et al. | | |
| 6,612,211 | B1 | 9/2003 | Stigliano et al. | | |
| 6,912,827 | B2 | 7/2005 | Forbes | | |
| 7,111,536 | B2 | 9/2006 | Belec et al. | | |
| 2002/0104782 | A1 | 8/2002 | DeWitt et al. | | |
| 2003/0052444 | A1 | 3/2003 | Luebben et al. | | |
| 2004/0155398 | A1 * | 8/2004 | Leitz | B65H 31/06 | 271/177 |
| 2005/0097867 | A1 | 5/2005 | Sammaritano et al. | | |
| 2006/0087068 | A1 * | 4/2006 | Bittenbender | B65H 3/46 | 271/2 |

FOREIGN PATENT DOCUMENTS

| | | |
|---|---|---|
| WO | 2004/065026 | 8/2004 |
| WO | 2010/062648 | 6/2010 |

* cited by examiner

METHOD AND APPARATUS FOR PROCESSING ENVELOPES CONTAINING CONTENTS

PRIORITY CLAIMS

This application is a continuation application of U.S. application Ser. No. 17/103,300 filed Nov. 24, 2020, which is a continuation of U.S. application Ser. No. 14/584,284 filed Dec. 29, 2014, still pending, which is a divisional application of U.S. patent application Ser. No. 13/103,763 filed on May 9, 2011 and issued as U.S. Pat. No. 8,919,084 on Dec. 30, 2014, which claims priority to U.S. Provisional Application No. 61/332,520, filed on May 7, 2010 The entire disclosure of each of the foregoing applications is hereby incorporated herein by reference.

FIELD OF THE INVENTION

The present invention relates to the field of processing mail. More specifically, the present invention relates to a workstation operable to process envelopes containing contents by presenting opened envelopes to an operator so the operator can extract the contents from the envelopes.

BACKGROUND

Automated and semi-automated machines have been employed for processing documents such as bulk mail. Due to the large quantity of mail received by many companies, there has long been a need for efficient sorting of incoming mail. Document sorting has become particularly important in the area of remittance processing.

Various companies routinely receive thousands of payment envelopes and other types of mail on a daily basis. Frequently, the envelopes received in the incoming mail have varying characteristics. For instance, the height, length and thickness of the envelopes may vary. In addition, the opacity of the envelopes may vary significantly due to the differences between standard envelopes and privacy envelopes commonly used for financial documents.

Although the known system provide for the efficient removal of the mail, it is desirable to provide an improved system that can increase the efficiency of processing the incoming mail. In accordance with the present invention, an apparatus and method are provided for processing mail that can accommodate a batch of mail containing envelopes having different characteristics.

SUMMARY OF THE INVENTION

The present invention provides a semi-automated apparatus for processing mail to remove contents from the envelopes. The apparatus is operable to cut two edges of an envelope and present the edge-severed envelope to an operator for manual extraction of the contents. As the apparatus processes the envelope, the envelope is jogged twice. The envelope is cut along the two edges opposite the jogged edges.

In one embodiment, the apparatus first jogs the contents relative to the first edge that is to be cut, and then the first edge is cut. After jogging the contents relative to the first edge, the apparatus jogs the contents relative to the second edge that is to be cut. The second edge is then cut. Alternatively, both edges are jogged and then both edges are cut.

According to one embodiment, the present invention provides an apparatus having an input bin for receiving a plurality of envelopes containing contents. A feeder is provided for feeding an envelope from the input bin. A first cutter is operable to cut a first edge of the envelope, and a second cutter is operable to cut a second edge of the envelope. A first jogging element is disposed between the feeder and the first cutter. The first jogging element jogs an edge of the envelope opposite the first edge of the envelope. A second jogging element is disposed between the feeder and the second cutter. The second jogging element jogs the edge of the envelope opposite the second edge. Additionally, the apparatus may include an extractor for opening the envelope after the envelope is edge-severed by at least one of the first and second cutters.

The present invention also provides a method for processing envelopes containing contents. According to the method, a stack of envelopes is provided. An envelope is fed from the stack, and the envelope is transported to a cutting element operable to cut a first edge of the envelope. As the envelope is transported from the stack to the first cutting element, the envelope is jogged relative to the first edge of the envelope. The envelope is transported from the first cutting element to a second cutting element. As the enveloped is transported between the feeder and the second cutting element, the envelope is jogged relative to the second edge of the envelop. After the first and second edges are severed, the contents are extracted from the envelope.

According to yet another aspect of the present invention, an apparatus for processing envelopes containing documents is provided in which the apparatus comprises a controller for controlling the feeding of the envelopes from an input bin.

The mail is stacked in the input bin, and the controller controls the operation of a drive mechanism to iteratively advance the stack toward a feeder to attempt to feed a piece of mail from the stack. During each iteration, the controller controls the drive mechanism and the feeder to advance the stack and to drive the feeder to attempt to feed the piece of mail. After a plurality of iterations, the controller controls the drive mechanism and the feeder to iteratively drive the stack in a reverse direction away from the feeder. During each iteration, the controller controls the drive mechanism and the feeder to urge the stack of mail away from the feeder and to drive the feeder to attempts to feed the piece of mail.

According to another aspect, the present invention provides a method for controlling the feeding of a stack of mail. In particular, according to the method the stack of mail is iteratively advanced toward a feeder to attempt to feed a piece of mail. During each iteration, the stack is advanced and the feeder attempts to feed the piece of mail. After a plurality of iterations, the stack of mail is iteratively driven in a reverse direction away from the feeder. During each iteration, the stack of mail is driven away from the feeder and the feeder attempts to feed the piece of mail.

According to yet another aspect, the present invention provides a method for processing envelopes containing content. The method includes the step of stacking a plurality of envelopes containing contents into an input bin to form a stack of envelopes in which the envelopes are in a generally vertical orientation. The stack is displaced toward a feeder. The pressure of the stack against the feeder is sensed, and the feeder is driven in an attempt to feed an envelope from the stack. The step further includes the step of detecting whether the feeder fed the envelope from the stack. The feeder is then driven a second time to attempt to feed the envelope is response to sensing that the pressure of the stack against the feeder is within a predetermined range and in response to detecting that the feeder did not feed the envelope from the stack during the step of driving the feeder. Subsequently, the stack is driven away from the feeder in response to sensing that the pressure of the stack against the feeder is within a predetermined range. The feeder is then driven again to attempt to feed an envelope after the step of driving the stack away from the feeder.

DESCRIPTION OF THE DRAWINGS

The foregoing summary and the following detailed description of the preferred embodiments of the present invention will be best understood when read in conjunction with the appended drawings, in which.

DETAILED DESCRIPTION OF THE INVENTION

Figure 1:
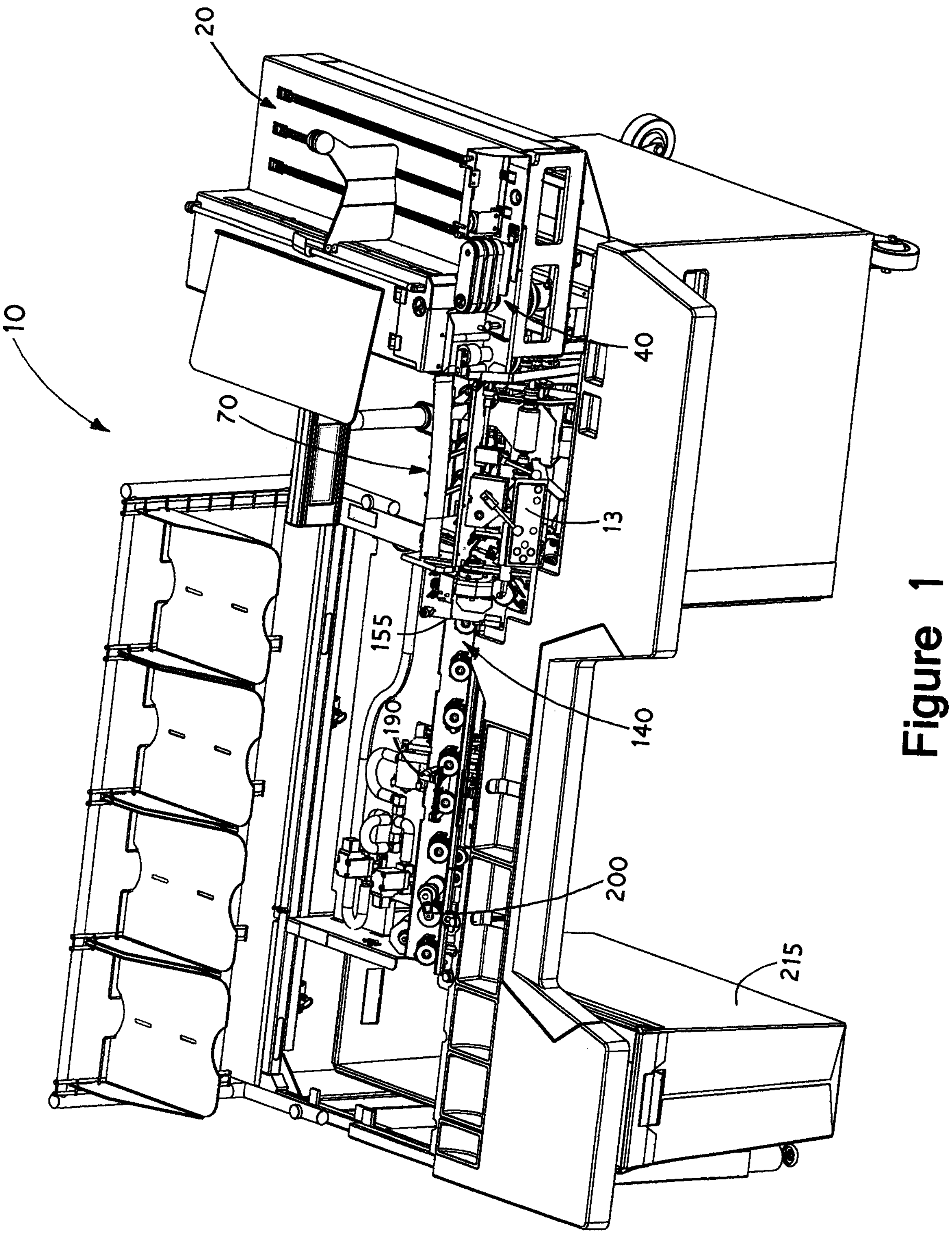
FIG. 1 is a perspective view of an apparatus for processing envelopes containing contents.

Referring now to the figures in general and to FIG. 1 in particular, a semi-automated mail processing workstation 10 is illustrated. The workstation 10 processes mail by severing one or two edges of each envelope in a stack of mail, and presenting the edge-severed envelopes one at the time to an operator who removes the documents from the envelope by hand. The operator can then manually reorient and sort the documents as necessary. After the operator removes the documents from an envelope, the envelope is transported to a waste container 215.

A general overview of the flow of mail is as follows. Initially, a stack of envelopes containing documents, referred to as a job, is placed into an input bin 20. A motor-driven pusher 25 supports the envelopes and advances the envelopes toward the front end of the input bin 20. A feed system 40 removes the lead envelope 5 from the front of the stack and transfers the envelope to a gate 80. As the envelope is conveyed to the gate 80, the envelope is jogged toward one edge to justify the contents in the envelope relative to one side of the envelope.

Figure 6:
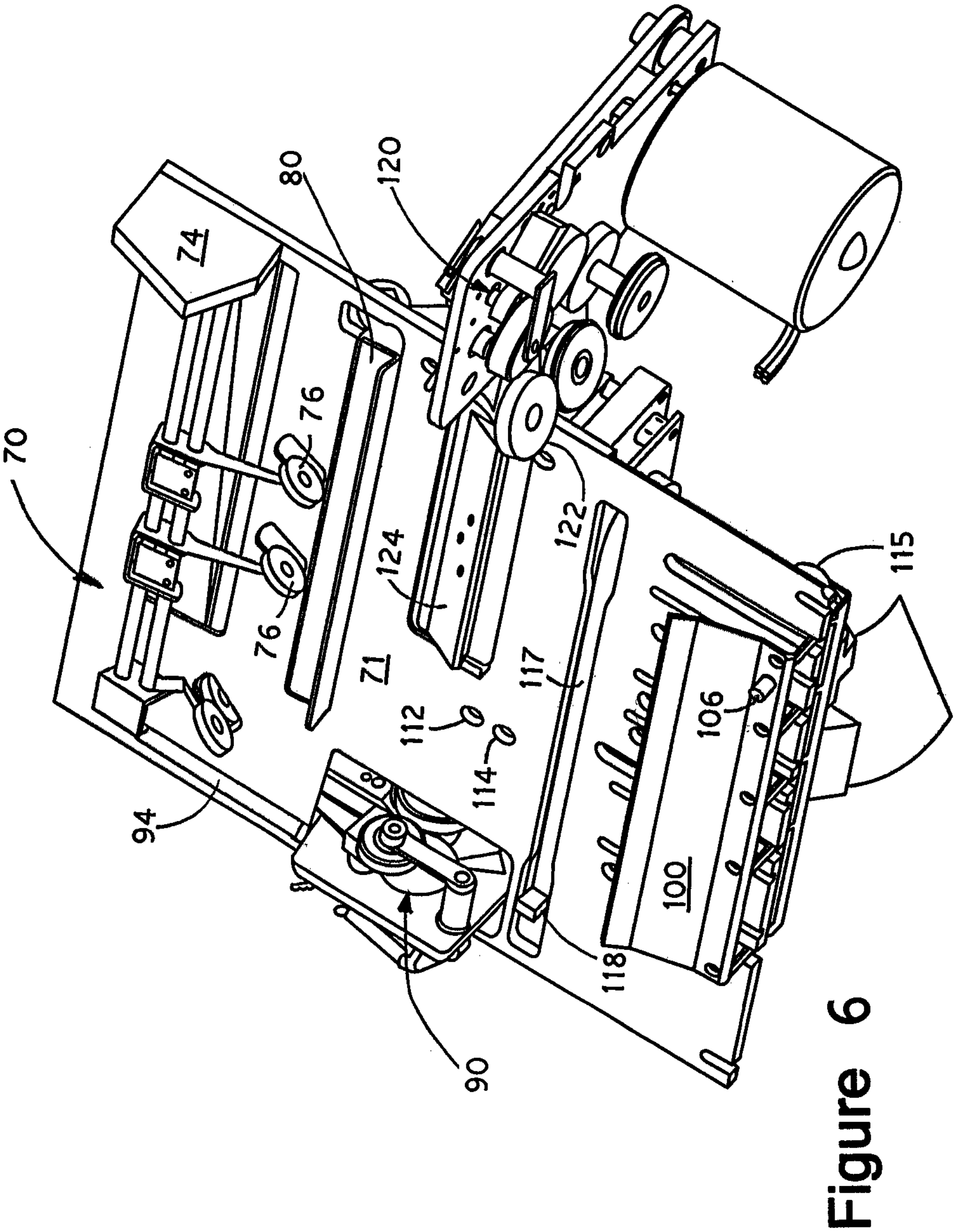
FIG. 6 is an enlarged rearward perspective view of the cutting station illustrated in FIG. 4.
Figure 7:
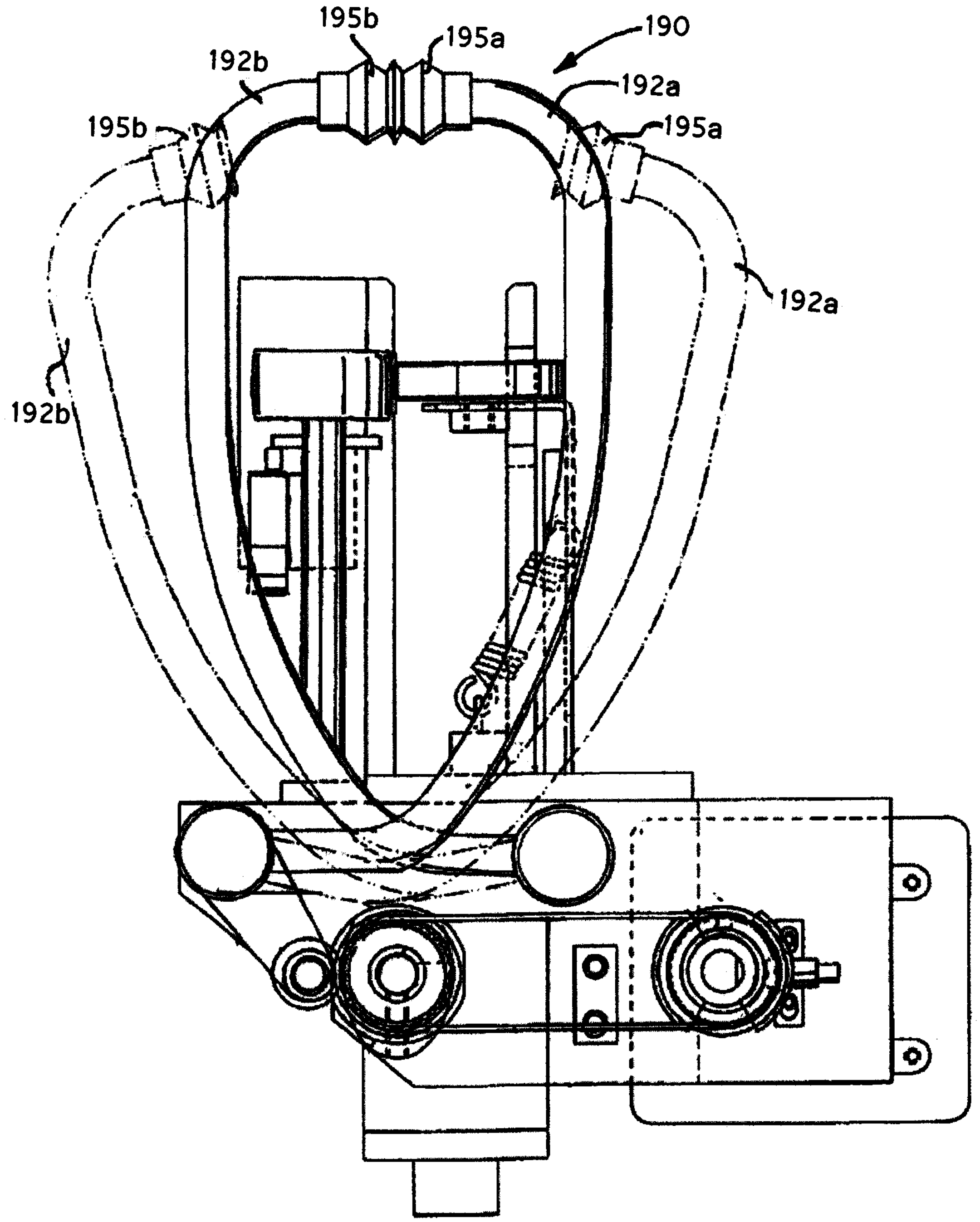
FIG. 7 is a fragmentary enlarged side view of an extractor of the apparatus illustrated in FIG. 1.

Referring to FIG. 6, the envelope 5 on the gate 80 is justified toward an edge by a plurality of opposing rollers 76. From the gate 80, the envelope 5 drops into a side cutter 90, which severs the side edge of the envelope if desired. From the side cutter, the envelope drops into a shuttle 100 jogging the contents toward the bottom edge of the envelope. The shuttle moves vertically to adjust the height of the top edge of the envelope to account for variations in the height of the different envelopes in the job. The shuttle moves vertically until the height of the top edge of the envelope 5 is within an acceptable range for advancing the envelope into a top cutter 120. The envelope is then transported to the top cutter 120, which severs the top edge of the envelope 5.

Referring to FIGS. 1 and 6, from the top cutter 120, the envelope enters the main transport 140. The main transport then advances the envelope to an extractor 190. The extractor 190 pulls apart the front and back faces of the envelope to present the contents of the envelope for removal. An operator then manually removes the contents from the envelope 5. The operator can then sort and reorient the contents if desired. A plurality of bins are provided in front of the main transport 140, as well as a plurality of adjustable shelves mounted on a rack behind the main transport 140.

After the operator removes the documents from the envelope 5, the apparatus 10 automatically advances the envelope to a verifier 200. The verifier 200 verifies that all of the documents were removed from the envelope before the envelope is discarded. From the verifier 200 the main transport 140 conveys the envelope into a waste container 215.

A controller controls the processing of the envelopes in response to signals received from various sensors at various locations of the workstation 10 and in response to parameters set for the job by the operator. For instance, in response to an indication from a sensor adjacent the gate 80 that there is no envelope on the gate, the controller sends a signal to the feed station 40 indicating that an envelope should be fed to the gate 80. Similarly, in response to an indication from a sensor in the shuttle 100 that there is no envelope in the shuttle, the controller sends a signal to the feed tray 80 indicating that an envelope should be dropped from the feed tray into the shuttle.

In most cases, the controller controls the operation of the various sections of the workstation independently from each other. In other words, a signal from the shuttle that there is no envelope in the shuttle does not cause the controller to send both a signal to gate 80 indicating that an envelope should be dropped and a signal to the feed station 40 indicating that an envelope should be fed to the gate. Instead, in response to the shuttle empty signal, the controller sends a signal to the gate 80 indicating that an envelope should be dropped. After the envelope is dropped, a sensor adjacent the gate sends a signal to the controller indicating that there is no envelope on the gate. The controller will then send a signal to the feed station 40 indicating that an envelope should be fed to the gate. This independence allows several operations to proceed simultaneously or asynchronously as required. As a result, a slowdown in one section does not necessarily slow down all of the other sections.

Input Bin

Figure 2:
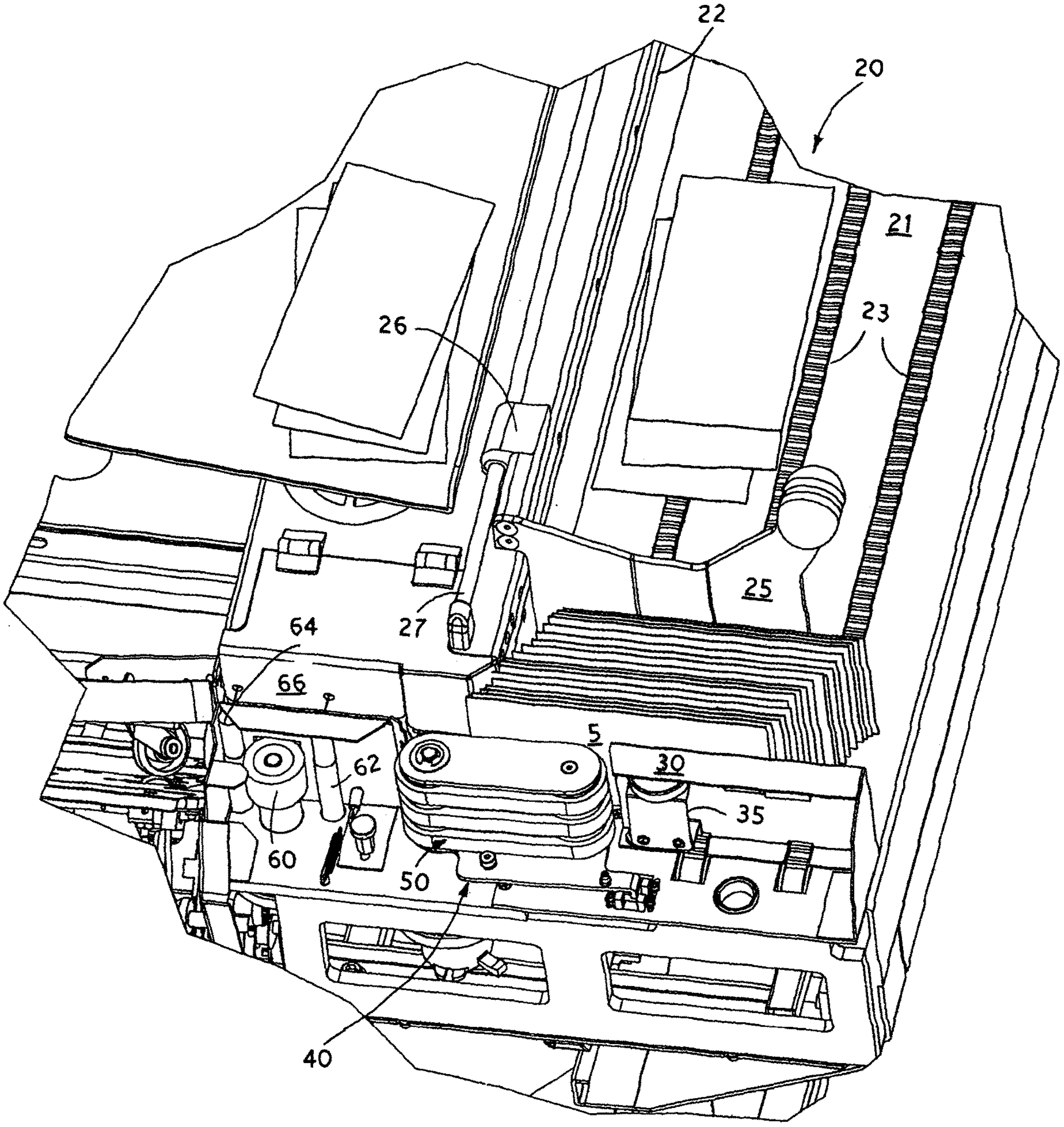
FIG. 2 is an enlarged perspective view of an input bin of the apparatus of FIG. 1.
Figure 3:
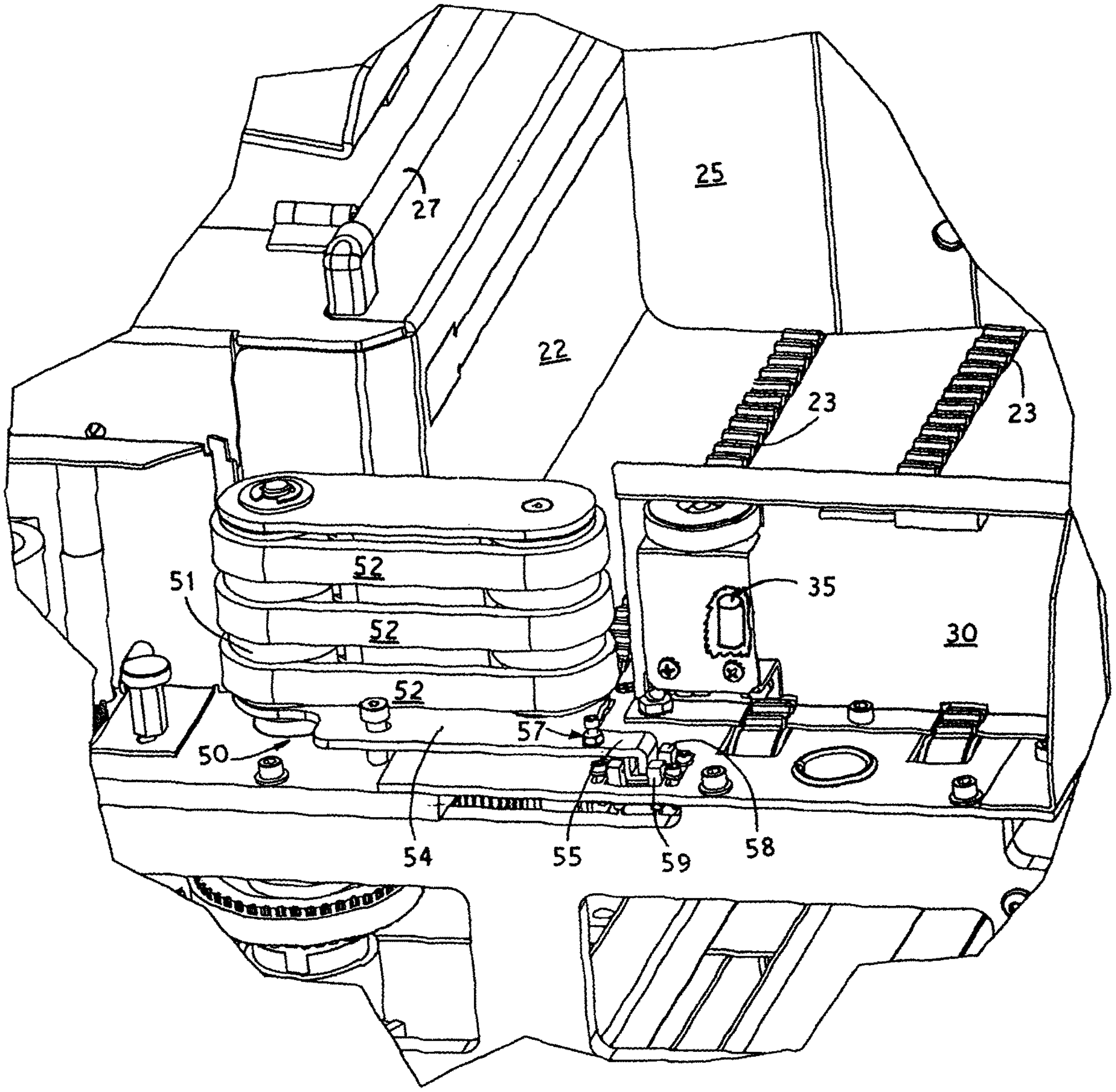
FIG. 3 is an enlarged perspective view of a feed station of the apparatus of FIG. 1.

Referring now to FIGS. 1-3, the operation of the input bin 20 will be described in greater detail. The function of the input bin 20 is to keep the stack of mail lightly pressed against an end wall 30, so that the feed station 40 can remove a piece of mail from the stack as necessary.

The input bin 20 includes a generally planar base plate 21 and a transverse sidewall 22 extending along the length of the input bin. A stack of mail is placed into the input bin so that a long edge of the envelopes is against the base plate 21, and a shorter edge of the envelopes is toward the sidewall 22. As shown in FIG. 2, the rearward end of the stack of mail is supported by a pusher 25. The pusher 25 and a plurality of belts 23 drive the stack of mail forward to keep the stack of mail lightly pressed against the end wall 30 and a stack pressure detector 35 at the front end of the input bin.

The pusher 25 is a generally planar vertical plate. As shown in FIG. 2, the pusher includes a guide 26 in the form of a collar that rides along a guide rail 27. The guide 26 guides the pusher 25 while a drive mechanism drives the pusher. In the present instance, the drive mechanism is a plurality of drive belts 23 in the bottom of the input bin 20.

As shown in FIG. 3, the drive belts are toothed belts, similar to timing belts. The teeth of the belts project upwardly from the base 21 of the input bin 20. The thickness of the pusher 25 is similar to or less than the pitch of the teeth in the belts 23, so that the lower edge of the pusher can be positioned between adjacent teeth in the belts to drive the pusher forwardly and rearwardly within the input bin. The mail also rides on the belts 23, so that the pusher 25 and the belts move the mail within the input bin. Alternatively, the belts may be recessed within the base plate 21 and the pusher may have a tang or other engagement feature projecting into engagement with the belt to drive the pusher forwardly. However, the present arrangement in which the mail engages the drive belts 23 provides the ability to drive the mail both forwardly and rearwardly, which can be beneficial as discussed further below.

As shown in FIGS. 2-3, the end wall 30 projects generally upwardly at the front end of the input bin, adjacent the feed station 40. In the present instance, the end wall 30 extends partway across the width of the input bin to create a gap between the end wall and the side wall 22. The gap creates an opening to engage the mail and feed the mail from the input bin 20.

In the present instance, a tilt sensor 35 is provided for detecting the angle of the lead envelope relative to vertical to determine whether the stack is at an appropriate angle relative to the feeder. Referring to FIG. 3, the arm onto which a roller is attached is shown broken away to show the tilt sensor, which is positioned between the arm and the end wall.

The tilt sensor 35 is an infrared reflective sensor that detects the proximity of the top edge of the lead envelope in the stack of mail to the end wall. Since the tilt sensor is an I/R sensor, the end wall 30 includes an aperture through which the tilt sensor emits an I/R beam. As the drive belts 23 and pusher 25 move the stack of mail forwardly, the top edge of the lead piece of mail in the stack is displaced toward the tilt sensor. As discussed further below in the Method of Operation, the controller may control the drive belts 23 to control movement of the stack in response to the pressure of the stack of mail against the tilt sensor 35.

Feed Station

Figure 5:
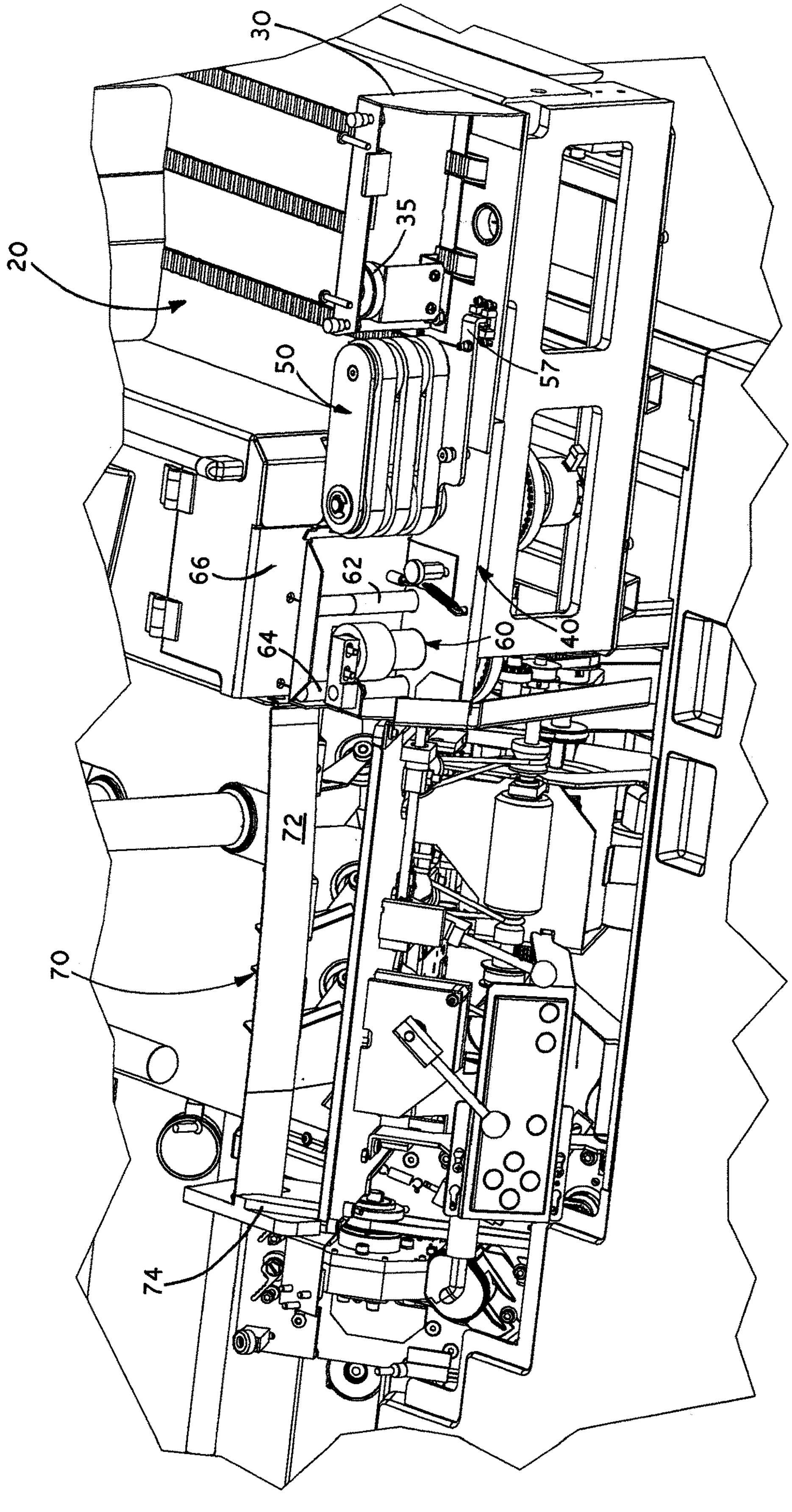
FIG. 5 is a perspective view of the feed station and cutting station of FIGS. 3 and 4.

Referring to FIGS. 2, 3 and 5, the details of the station 40 will be described in greater detail. The feed station 40 feeds envelopes from the stack of mail and serially conveys the envelopes to the cutting station 70. Although the feed station may include a single feed mechanism, in the present instance, the feed station includes a feeder 50 and a discharge drive 60. The feeder 50 feeds envelopes from the stack of mail in the input bin 20. The discharge drive 60 receives envelopes from the feeder and drives the envelopes to the cutting station 70.

Referring to FIGS. 2-3, the feeder 50 is positioned adjacent the end wall 30 in the gap between the end wall and the side wall 22 of the input bin 20. The feeder 50 comprises an element configured to separate an envelope in the input bin from the rest of the stack of envelopes. Various elements may be used, such as a pivotable suction cup, a rotatable suction cup, or one or more rotary elements. In the present instance, the feeder 50 comprises a plurality of rotatable belts 52 that are entrained about two pulleys: (1) a drive pulley 51 driven by a feeder motor 56, and (2) a driven pulley. The belts 52 are vertically spaced apart from one another along the height of the pulleys. Additionally, the driven pulley is mounted on an arm 54 that is pivotable about the axis of the drive pulley 51.

The feeder 50 is pivotably mounted so that the feeder can pivot toward and away from the stack of mail in the input bin. More specifically, a biasing element, such as a spring, biases the feed arm 54 toward the stack of mail. In this way, the feeder 50 pivots about the driven pulley and is biased into engagement with the stack of mail. As the feeder 50 rotates, the feeder engages the lead piece of mail in the stack and translates the piece of mail laterally, through the gap between the end wall 30 and the side wall 22, away from the stack of mail.

It is desirable to maintain the pressure of the stack of mail against the feeder within a predetermined range. If the pressure of the stack of mail against the feeder 50 is too high, it is more likely that the feeder may feed two pieces of mail at one time, leading to increased jams in the document path. If the feed pressure is too low, the feeder may not be able to feed the lead envelope from the stack of mail. Therefore, in the present instance, the feed station 40 includes a feed sensor 57 for detecting the feed pressure. Specifically, the feed sensor 57 detects the deflection of the feed arm 54, and since the feed arm 54 is biased toward the stack of mail, displacement of the feed arm 54 is proportionate to the pressure of the stack against the feeder 50.

The feed sensor 57 may be any of a variety of sensors for detecting the displacement of the feed arm or the force applied to the feed arm. In the present instance, the feed sensor comprises two optical sensors 58, 59. A projection 55 on the end of the arm projects between the two sensors. The first sensor 58 represents a low feed pressure; the second sensor 59 represents a high feed pressure. In the present instance, the projection 55 on the feed arm is wider than the distance between the first and second sensors. When the feed arm projection 55 blocks both sensors 58, 59, the feed pressure upon the feeder 50 is within an appropriate range. Alternatively, the feed arm projection 55 may be narrower than the distance between the first and second sensors, so that when the projection does not block either sensor it is assumed that the projection is between the two sensors, indicating that the stack pressure against the feeder is within an appropriate range.

If the feed arm projection 55 blocks the low sensor 58, but not the high sensor, then the stack pressure may be too low. In response, the controller may activate the drive belts 23 to advance the stack of mail. Conversely, if the feed arm projection 55 blocks the high pressure sensor 59, but not the low pressure sensor 58, then the stack pressure may be too high. In response, the controller may activate the drive belts 23 to move the stack of mail rearwardly. In this way, the controller may control the displacement of the mail within the input bin to maintain the pressure of the stack of mail against the feeder within an appropriate range. Further, as discussed below in the Method of Operation, the signals from the feed sensor 57 may be used in conjunction with the signals from the tilt sensor to control the displacement of the stack of mail to improve reliability and efficiency of the feeder 50.

From the feeder 50, the pieces are driven to the discharge drive 60. The discharge drive 60 may be any of a variety of drive mechanisms for driving an envelope forwardly along a path. In the present instance, the discharge drive 60 is a pair of opposing rollers forming a nip for receiving an envelope. In particular the pair of rollers includes a drive roller, driven by a drive mechanism such as a motor, and an opposing driven roller. The pair of rollers are operable to engage an envelope and drive the envelope forwardly toward the cutting section 70.

A guide 66 guides the envelopes through the discharge drive 60. The guide comprises a pair of generally vertical walls spaced apart from one another to form a slot. The feeder 50 feeds an envelope through the slot and to the discharge drive 60. The guide 66 includes a pair of openings through which the rollers of the discharge drive project to engage the envelope in the guide.

One or more sensors are provided for monitoring the flow of envelopes into and out of the discharge drive 60. In the present instance, two optical sensors 62, 64 are provided. Each sensor comprises an infrared emitter and an infrared receiver that straddle the guide 66. Apertures are provided in the guide to allow the infrared beam from the emitter to pass through the guide to the receiver. When the envelope passes through the guide, the envelope blocks the sensor when it is at the sensor. The first sensor 62 is a feeder exit sensor, which detects the envelope as it leaves the feeder 50. The feeder exit sensor 62 is positioned downstream from the feeder 50 and upstream from the discharge drive 60. The second sensor 64 is a discharge sensor, which detects the envelope as it leaves the discharge drive. The discharge sensor 64 is positioned downstream from the discharge drive 60.

The discharge drive 60 may be controlled to feed an envelope to the cutting station automatically when the discharge drive receives an envelope from the feeder 50. However, as discussed further below in the Method of Operation, the controller controls the discharge drive so that an envelope received from the feeder is staged at the discharge drive until a signal is received indicating that an envelope should be fed from the feed station 40 to the cutting station 70. More specifically, in the present instance, an envelope is staged at the discharge drive 60 until the controller receives a signal that there is no envelope staged at the next staging area in the cutting station 70.

Cutting Station

Figure 4:
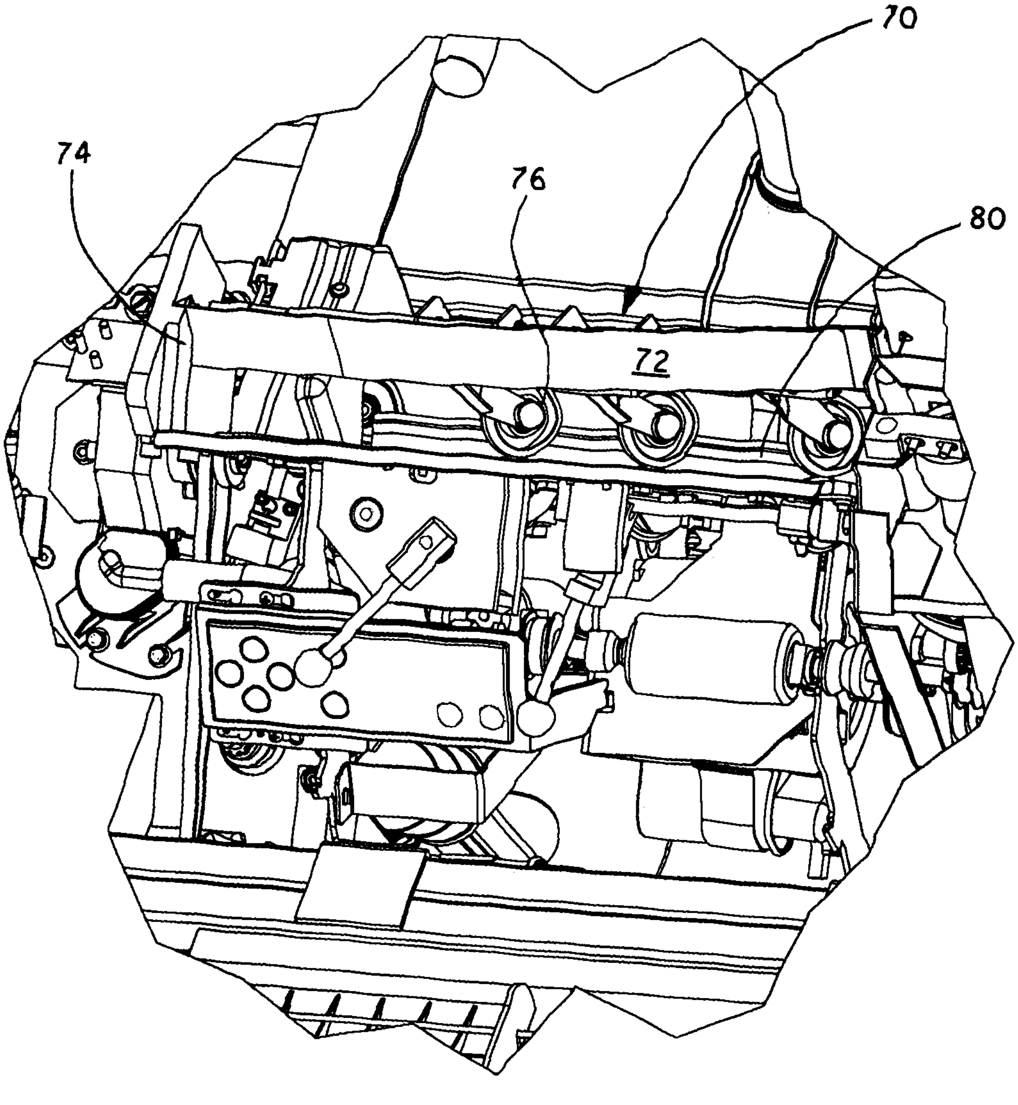
FIG. 4 is an enlarged perspective view of a cutting station of the apparatus of FIG. 1.

Referring to FIGS. 4-6, the details of the cutting station will be described in greater detail. The cutting station 70 is a generally vertical station having a first cutter 90 for optionally cutting a side edge of the envelope, and a second cutter 120 for cutting the top edge of the envelope. When the envelope enters the cutting station, the envelope is dropped onto a retractable gate 80 that supports the bottom edge of the envelope to prevent the envelope from advancing to the side cutter 90. After the gate retracts, the envelope drops into the side cutter 90 before falling into a shuttle 100. The shuttle 100 positions the top edge of the envelope at an appropriate height and then ejects the envelope to the top cutter 120.

As discussed previously, the discharge drive 60 conveys an envelope to the cutting section 70. In the present instance, when the envelope leaves the discharge drive, the envelope freely falls through the cutting station toward the gate 80. The discharge drive 60 conveys the envelope with sufficient horizontal force that the envelope is displaced horizontally far enough to reach the retractable gate 80, which is horizontally spaced from the discharge drive. Additionally, in the present instance, the discharge drive 60 drives the envelope with sufficient speed to drive the envelope across the width of the cutting station 70 until the envelope impacts a stop in the form of an end wall 74. As shown in FIGS. 4-5, in the present instance, the cutting station also includes an entry guide 72 in the form of an elongated strip that is angled to maintain the envelope in a generally vertical orientation and to guide the envelope toward the end wall 74.

When the envelope impacts the end wall 74 the envelope is not positively engaged by an element in the cutting station that would impart substantial force on the faces of the envelope. Therefore, the contents in the envelope are generally free to move within the envelope if the contents are shorter than the length of the envelope interior. Accordingly, when the envelope impacts the end wall, the impact tends to jog the contents of the envelope toward the leading edge of the envelope. After the envelope impacts the end wall 74, the envelope rebounds and then falls freely toward the gate 80.

The gate 80 is a retractable gate that pivots between an extended position and a retracted position. In the extended position, the gate 80 forms an elongated ledge projecting generally horizontally away from the base plate 71 of the cutting station, so that the gate is capable of supporting the bottom edge of the envelope. In the retracted position, the gate 80 pivots inwardly so that it is flush with or recessed within the base plate 71 so that the gate does not support the lower edge of the envelope.

Referring now to FIGS. 5 and 6, when the feed station 40 feeds an envelope into the cutting station 70, the bottom edge of the envelope rests against the gate 80 to keep the envelope from dropping down into the shuttle 100. A side justifier 76 justifies the envelope against a side fence 94. The side justifier includes a pair of idler rollers angled toward the side fence 94, and a pair of opposing drive rollers projecting through the base plate 71 that are driven by a motor. The idler rollers are mounted on biased mounting arms that bias the idler rollers toward the drive rollers. When an envelope is fed into the cutting section, the envelope falls toward the justifier so that each envelope passes into the nip of the justification rollers. The justifier 76 then justifies the envelope downwardly against the gate 80 and sidewardly against the side fence 94.

A solenoid actuated arm drives the gate between the extended and retracted positions. In the extended position the gate supports the lower edge of the envelope. In the retracted position the gate is pivoted downwardly into a recess in the base plate 71, allowing the envelope on the gate to drop into the side cutter 90. The operation of the gate 80 is controlled by the controller. In response to an indication from a shuttle sensor 106 that there is no envelope in the shuttle 100, the controller sends a signal to open the gate so that the envelope on the gate drops into the side cutter 90.

Referring to FIG. 6, the side cutter includes a plurality of drive rollers and opposing idlers rollers. As the envelope passes between the rollers a rotary knife severs the side edge of the envelope. The severed edge drops down a scrap chute into a waste container. Alternatively, rather than a rotary knife a milling cutter may be used. Such a cutter mills off the edge of the envelope as the envelope passes the cutter.

A build-up of scraps in the scrap chute can interfere with the operation of the side cutter causing a jam. Therefore a sensor (not shown) in the scrap chute monitors the scraps in the scrap chute. If the sensor detects a build-up of scraps, a signal is sent to the controller indicating a build-up and the operation of the workstation is shut down. A message on the LCD display prompts the operator to clear the scrap chute. The operation of the workstation resumes after the operator clears the scrap chute.

The amount of envelope the side cutter 90 severs depends upon the position of the side fence 94. The side fence 94 position can be infinitely between a maximum thickness and a minimum depth of cut. Alternatively, the side cutter may include a plurality of pre-set depth of cut positions ranging from no cut to a relatively thick depth of cut (about ½") of the envelope. In the no-cut position, the side fence 94 is moved away from the side cutter, so that the side cutter does not cut the envelope.

From the side cutter 90, the envelope drops into the shuttle 100. Referring to FIG. 6, the shuttle 100 can be seen most clearly. The operation of the shuttle 100 and the top cutter 120 are similar to the operation of the shuttle and top cutter disclosed in U.S. Pat. No. 6,230,471, which is owned by OPEX Corp. of Moorestown, NJ. The entire disclosure of U.S. Pat. No. 6,230,471 is hereby incorporated herein by reference.

The shuttle 100 operates to vertically adjust the envelope so that the location of the top edge is located within a predetermined range. The shuttle adjusts the position of the envelope so the envelope is at the proper position to be severed by a top cutter 120. Prior to entering the top cutter 120, a top justifier 122 justifies the top edge of the envelope against an upper stop 124. In order for the justifier to justify the envelope against the upper stop 124, the vertical position of the upper envelope should fall within a set operating range. If the top edge is below the operating range, the rollers of the justifier will not properly engage the envelope and the envelope will either jam in the top cutter 120 or pass below the top cutter. If the top edge is above the operating range, the envelope will jam in the top cutter 120.

The shuttle 100 includes a shuttle bin 101 that receives the envelope after the envelope drops from the side cutter 90. When the envelope falls into the shuttle100, the faces of the envelope are not positively entrained so that the contents of the envelope are generally free to move within the envelope. Accordingly, when the envelope impacts the bottom of the shuttle, the impact operates to jog the contents within the envelope toward the bottom edge of the envelope, particularly if the contents are shorter than the interior height of the envelope.

The envelope rests in the bin against the base plate 71. A vertical drive motor 102 drives the shuttle vertically relative to the base plate. The vertical displacement of the shuttle is controlled by the controller in response to signals received from an upper justification sensor 112 and a lower justification sensor 114. The envelope is properly positioned if the top edge of the envelope is between the upper and lower sensors 112, 114. Therefore, if the upper sensor 112 does not detect an envelope and the lower sensor 114 indicates an envelope, the envelope is properly positioned and the shuttle does not adjust vertically. If both the upper and lower sensors detect the envelope, then the envelope is too high and the shuttle adjusts downwardly until the upper sensor does not detect the envelope. Conversely, if both the upper and lower sensors do not detect the envelope, then the envelope is too low and the shuttle adjusts upwardly until the lower sensor detects the envelope.

The cutting station 70 includes an ejector for ejecting the envelope out of the shuttle. In the present instance, the ejector is a rotatable belt having at least one cleat projecting away from the surface of the belt. To eject the envelope, the cleat 118 of the cleat belt engages the envelope to drive the envelope laterally out of the shuttle and toward the top cutter 120. A drive motor 115 drives the cleat belt 117. The cleat engages the trailing edge of the envelope in the shuttle 100. As the cleat belt 117 advances, the cleat drives the envelope in the shuttle 100 toward the top cutter 120, transporting the envelope from the shuttle bin.

From the shuttle, the envelope enters a top justifier 122. The top justifier 122 justifies the top edge of the envelope against an upper stop 124. The upper stop has a shoulder that acts as a stop for justifying the envelopes. The stop 124 is tapered to create a ramp so that the envelopes can pass over the shoulder of the stop as they drop from the gate 80 to the shuttle 100. From the top justifier 122 the envelope passes through the top cutter 120, which is a rotary cutter similar to the side cutter 90 described above, or could be a milling cutter as described above. From the top cutter 120, the envelope is conveyed to the main transport 140.

Main Transport

Referring to FIG. 1 the main transport includes one or more belts and a plurality of rollers opposing the belt(s). The envelopes are entrained between the belt(s) and rollers to positively engage the envelopes and convey the envelopes along the transport to the extraction station 190 and then the verifier 200. The main transport, extraction station and verifier are substantially similar to the operation of the main transport, extraction station and verifier of the system disclosed in U.S. Pat. No. 6,230,471, mentioned above.

The main transport 140 conveys the envelope from the staging area adjacent the top cutter 120 to the extractor 190 in response to an indication that the operator has extracted the contents of the envelope in the extractor 190. The main transport may include a staging area 155, which is essentially a waiting area for envelopes on the main transport. The staging area operates to reduce the time the operator must wait for the next envelope to be advanced to the extractor after the contents in an envelope are extracted.

Extractor

The extractor 190 operates to pull apart the faces of the edge-severed envelopes and present the contents so that an operator can easily remove the documents. After the operator removes the contents, a sensor sends a signal to the controller that the contents have been extracted. The empty envelope is then transported to the verifier 200 and another envelope is fed to the extractor 190.

Referring to FIG. 8, the extractor 190 includes a pair of opposing vacuum suction cups 195 mounted on two pivotal extractor arms 192*a*, 192*b*. The extractor suction cups 195 are connected to a vacuum pump. In FIG. 8, the extractor 190 is shown in two alternative positions. In the first position, the extractor arms are pivoted away from one another. In the second position the extractor arms are pivoted toward one another.

Before an envelope enters the extractor 190, the extractor arms are pivoted away from one another. When the envelope enters the extractor, the arms 192*a*, 192*b* pivot toward one another and negative pressure is supplied to the suction cups so that the suction cups engage the faces of the envelope. The arms then pivot away from one another pulling apart the faces of the envelope, which have been severed along the top edge and preferably the side edge. The operator can then remove the contents of the envelope.

Preferably, the negative pressure is applied to the suction cups before the suction cups contact the envelope. Doing so reduces the likelihood that the negative pressure will bleed through the faces of the envelope and pull the contents of the envelope against the faces of the envelope when the arms are pivoted away from one another.

The transport 140 pinches the envelope between idler rollers and a conveyor belt. Therefore, when the extractor arms pull apart the faces of the envelope, the envelope and its contents remain pinched between the idler rollers and the belt. To remove the contents, the operator must pull the contents with enough force to overcome the friction between the envelope and the contents caused by the pinching action of the extraction transport. In addition, this friction is maintained until the bottom edge of the contents is pulled past the pinch point.

Verifier

The verifier 200 is located at the end of the transport 140. The verifier checks the thickness of each envelope to ensure that all of the contents have been removed from the envelope before the envelope is discarded into the waste container 25. The verifier can use an optical sensor to check the thickness of the envelope, similar to the optical sensor used by the extractor 190. However, in the present instance the verifier checks the thickness of the envelope by measuring the distance between the outer surfaces of the envelope faces. To measure this distance the verifier 200 includes a rotary variable inductive transducer (RVIT).

If the verifier 200 detects a thickness that is greater than a reference value, a signal is sent to the controller indicating that the envelope in the verifier is not empty. An indicator light (not shown) is lit indicating to the operator that the envelope at the verifier should be removed and checked to ensure that all of the contents were removed.

The controller controls the operation of the extraction transport 170 to ensure that the trailing edge of each envelope stops in the same position in the verifier 200 relative to the RVIT. By monitoring the trailing edge, the apparatus ensures that an envelope is not accidentally fed past the verifier and directly into the waste container when a job of variable length envelopes is processed.

Method of Operation

To start a job, a stack of mail is placed into the input bin as shown in FIG. 2. The envelopes are placed into the input bin in a generally vertical orientation with the long edge of the envelopes against the drive belts 23. The pusher 25 is moved against the stack so that the pusher supports the rearward end of the stack.

Once the operator has placed the stack of mail into the input bin 20, the operator inputs a command via input controls 13 to start the job. In response, the controller activates the drive belts 23 to drive the conveyor forwardly so that the forward edge of the stack engages the feeder 50. The feeder 50 feeds a piece from the stack and advances the piece to the discharge drive 60. The discharge drive 60 drives the piece into the cutting section 70. In the present instance, the discharge drive 60 drives the piece forwardly with sufficient velocity to drive the piece across the cutting station until the leading edge of the piece impacts the end wall 74 to jog the contents in the envelope toward the leading edge of the envelope. After impacting the end wall 74, the piece falls onto the retractable gate 80. A justifier 76 justifies the piece toward a side cutter 90. When the gate retracts, the piece falls and enters the side cutter. Depending on the job parameters, the side cutter may sever an edge of the envelope or the envelope may pass through without being severed.

From the side cutter 90, the piece falls into the shuttle 100. The piece impacts the bottom of the shuttle with sufficient force to jog the contents of the envelope toward the bottom edge of the envelope. The shuttle 100 moves vertically as necessary to ensure that the upper edge of the piece in the shuttle is properly oriented to enter the top cutter. More specifically, the shuttle drives upwardly or downwardly so that the top edge of the piece is within a predetermined upper vertical limit and lower vertical limit.

The cleat belt 117 then discharges the piece from the shuttle 100 into the top justifier, which justifies the top edge of the piece. The top cutter 120 then severs the top edge of the piece. The top cutter then displaces the piece toward the main transport 140. The main transport 140 then drives the piece to the extractor 190. The extractor pulls back the faces of the envelope to present the contents to the user for extraction. After the operator extracts the contents, the empty envelope is advanced to the verifier 200. The verifier 200 verifies that the envelope is empty. If the envelope is empty, the envelope is advanced to the waste container 215. If the verifier detects that the envelope is not empty, the envelope is not advanced and a signal is provided to indicate to the operator that the envelope should be checked to ensure that all of the contents have been removed.

The flow of pieces through the system is controlled in response to a plurality of sensors along the envelope path from the input bin 20 to the verifier 200. The flow of envelopes is controlled to ensure that a constant feed of envelopes is provided to the extractor 190, so that after the operator removes the contents from an envelope, the envelope is advanced, and another envelope is fed to the extractor so that the operator can continue to extract contents from the envelopes.

During the time between an empty envelope advancing away from the extractor and the time that the next envelope arrives at the extractor, the operator is not able to extract contents. Therefore, it may be desirable to minimize the delay between the time that an envelope is advanced away from the extractor and the time that the next envelope arrives at the extractor. Accordingly, in the present instance, the envelopes are staged at various locations along the path between the input bin and the verifier.

In the present instance the system includes three staging areas, and optionally may include a fourth. The first staging area is the discharge drive 60. The second staging area is the gate 80. The third staging area is the shuttle 100, and the optional fourth staging area is staging area 155 on the main transport 140. In one embodiment, the system 10 does not include the staging area 155. Instead, when an envelope is advanced from the extractor, the next envelope is advanced from the shuttle 100. However, it should be understood that the number and placement of the staging areas can be varied as desired, and in the following discussion, the system is described as including the optional staging area 155.

In response to an indication that an envelope has been conveyed away from a staging area, the envelope from the upstream staging area is advanced to the next staging area. However, the different staging areas are controlled independently, so that a signal indicating that an envelope has been conveyed away from a staging area does not prompt all of the staging areas upstream to advance an envelope. Instead, as each staging area advances an envelope, the next upstream staging area advances an envelope. Specifically, when an envelope is conveyed from the extractor 190 to the verifier 200, the main transport 140 advances the envelope at the staging area 155 to the extractor. Once the envelope at the staging area is advanced, a sensor at the staging area provides a signal to the controller indicating that there is no envelope at the staging area. In response, the controller activates the cleat belt in the shuttle 100 to advance an envelope from the shuttle to the top cutter 120 and then to the staging area 155.

Once the envelope is discharged from the shuttle 100, a sensor provides a signal to the controller indicating that there is no envelope in the shuttle. The controller activates the gate 80 to retract the gate 80 so that the envelope resting on the gate is advanced to the side cutter 90 and then dropped to the shuttle. Once the gate 80 drops the envelope, a sensor adjacent the gate provides a signal to the controller indicating that there is no envelope on the gate. The gate is then extended from its retracted position, and the controller activates the discharge drive 60 so that the envelope staged at the discharge drive is conveyed into the cutting section 70 and onto the gate 80.

Once the discharge drive 60 advances the envelope into the cutting station 70, the discharge sensor 64 provides a signal to the controller indicating that there is no envelope at the discharge drive. The controller then selectively activates the feeder 50 and the drive belts 23 in the input bin to feed a piece of mail from the input bin to the discharge drive 60.

Although the controller controls the feeding of a piece of mail from the input bin in response to a signal that the there is no envelope at the discharge drive, the controller may also control the operation of the feeder in response to signals from the tilt sensor 35 and the feed sensor 56. As discussed below, the controller controls the operation of the feeder 50 and the drive belts 23 in response to signals from the tilt sensor 35, the feed sensor 56 and an indication from the feeder exit sensor 62 that the sensor detects the leading edge of an envelope.

In the present instance, the controller controls the feeder and the drive belts 23 in the input bin 20 as follows. The tilt sensor 35 detects the angle of the lead piece relative to vertical and the feeder sensor 57 detects the stack pressure against the feeder. If the controller receives a signal from the feeder sensor indicating that the stack pressure is within the predetermined upper limit and lower limit, and a signal from the tilt sensor indicating that the stack angle is within a predetermined upper and lower angular limit, then the controller activates the feeder motor 56. The motor drives the drive pulley 51, which drives the feed belts 52. The feed belts 52 engage the stack of mail to pull the lead piece from the stack and advance the piece to the discharge drive 60.

If the controller activates the feeder 50 and the feeder exit sensor 62 detects the leading edge of an envelope, then it is assumed that the feeder has successfully fed a piece of mail, and the feeder is deactivated after a sufficient time delay to ensure that the envelope is driven to the discharge drive 60. Alternatively, the feeder may continue to run until the leading edge of the envelope is detected at the discharge sensor 64.

If the controller activates the feeder 50 and the feeder exit sensor 62 does not detect an envelope within a predetermined time frame, and the feed sensor 57 indicates that the stack pressure is within the predetermined range, then the controller activates the motor to drive the drive belts 23 forwardly to advance the mail toward the feeder. The feeder 50 then attempts to feed an envelope again. Alternatively, if the feed sensor indicates that the stack pressure is within an acceptable range, but the tilt sensor indicates that the vertical angle is not within an acceptable range, then the drive belts may be activated to advance the stack until the tilt sensor indicates that the stack is at an acceptable angle. Once the tilt sensor and feed sensor indicate that the stack pressure and angle are acceptable, the feeder again attempts to feed a piece. This process of controlling the feeder and the drive belts may be repeated iteratively until either an envelope is fed or either (a) the feed sensor indicates that the stack pressure has exceeded a threshold or (b) the tilt sensor indicates that the stack angle has exceeded a threshold. Once the feed sensor indicates that the stack pressure or tilt angle exceed a threshold and no piece has been fed, the system may declare that there is a jam and provide a signal to the operator to manually attend to the jam. Alternatively, rather than continuing to advance the stack and attempt to feed an envelope until one of the sensors exceeds a threshold, the system may iteratively advance the stack and attempt to feed a piece a set number of times, after which the system may declare a jam.

Rather than declaring a jam as described above, after advancing the stack and attempting to feed an envelope, the system may back off the stack and then attempt to feed a piece. Specifically, after one or more attempts to advance the stack and feed a piece, the system may reverse the drive belts 23 and drive the stack rearwardly away from the front wall 30 of the input bin. Since the stack rests on the drive belts 23, reversing the drive belts moves the pusher 25 and the stack away from the front wall 30 and the feeder 50.

After backing off the stack, the feeder is activated to attempt to feed a piece. If the feeder exit sensor 62 detects the leading edge of an envelope, then it is assumed that an envelope was fed, and the feeder is operated as previously described to feed subsequent documents as necessary. If no envelope is detected, the stack may subsequently driven forwardly again and the feeder may attempt to feed an envelope. Alternatively, in the present instance, the system continues to iteratively back up the stack and attempt to feed an envelope as long as the feed sensor 57 indicates that the stack pressure is above a predetermined minimum and/or the tilt sensor 35 indicates that the stack angle is above a predetermined minimum. Once the tilt sensor indicates that the stack angle has fallen below a predetermined minimum and/or the feed sensor indicates that the stack pressure has fallen below a predetermined minimum, the system may declare a jam. Alternatively, the controller may control the drive belts to iteratively advance the drive belts again and attempt to feed a piece as described above. Optionally, before the system switches from iteratively driving the stack rearwardly to iteratively driving the stack forwardly, the system may drive the stack rearwardly for a preset time to attempt to clear the stack from any problem that there may have been. The system then iteratively advances the stack and attempts to feed an envelope, as described above.

As described above, the system is operable to iteratively advance and reverse the stack of mail and attempt to feed an envelope. By advancing and reversing the stack, the likelihood of feeding an envelope without the need for intervention from the operator is improved. Although the above description describes one or more particular methods for advancing and reversing the stack, it should be understood that controlling the feeder by advancing and automatically withdrawing the stack of mail is optional. The operation of the input bin and the feeder is not limited to any particular method of advancing the stack of mail in order to feed an envelope.

It will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as set forth in the claims.

The invention claimed is:

1. A method for feeding envelopes containing contents, comprising the steps of:
   - stacking a plurality of envelopes containing contents in an input bin to form a stack of envelopes in which the envelopes are in a generally vertical orientation;
   - displacing the stack toward a feeder;
   - sensing a pressure of the stack against the feeder;
   - driving the feeder to attempt to feed an envelope from the stack;
   - detecting whether the feeder fed the envelope from the stack;
   - iteratively driving the stack toward and away from the feeder in response to detecting that the feeder did not feed the envelope from the stack.

2. The method of claim 1 comprising the step of driving the feeder to attempt to feed the envelope during the step of iteratively driving the stack.

3. The method of claim 1 comprising the step of detecting an angular orientation of the front of the stack adjacent the feeder.

4. The method of claim 3 wherein the step of iteratively driving the stack toward the feeder is in response to the detected angular orientation of the front of the stack.

* * * * *